United States Patent [19]
Rose

[11] 3,828,456
[45] Aug. 13, 1974

[54] CAR TOP ADVERTISING STAND
[76] Inventor: Ralph B. Rose, P.O. Box 727, Miami, Fla. 33070
[22] Filed: July 31, 1972
[21] Appl. No.: 276,595

[52] U.S. Cl............................................. 40/129.C
[51] Int. Cl.............................................. G09f 7/00
[58] Field of Search.......... 40/129 C, 125 N, 124.1; 116/173

[56] References Cited
UNITED STATES PATENTS
| | | | |
|---|---|---|---|
| 2,275,711 | 3/1973 | Ybanez | !116/63 P |
| 2,935,238 | 5/1960 | Koehler | 40/125 N X |
| 3,290,813 | 12/1966 | Rose | 40/129 C |
| 3,292,291 | 12/1966 | Kelley | 40/129 C |
| 3,440,748 | 4/1969 | Hackley | 40/129 C |

Primary Examiner—Robert W. Michell
Assistant Examiner—Wenceslao J. Contreras

[57] ABSTRACT

An advertising stand of paperboard construction adapted to be stored or packaged in flat paperboard blank form and to be erected to a pyramidal form for stationary support on the top surface of an automobile roof. Contact adhesive surfaces provide means for securing the advertising stand in erected pyramidal configuration and for securing the erected stand on an automobile top surface.

1 Claim, 8 Drawing Figures

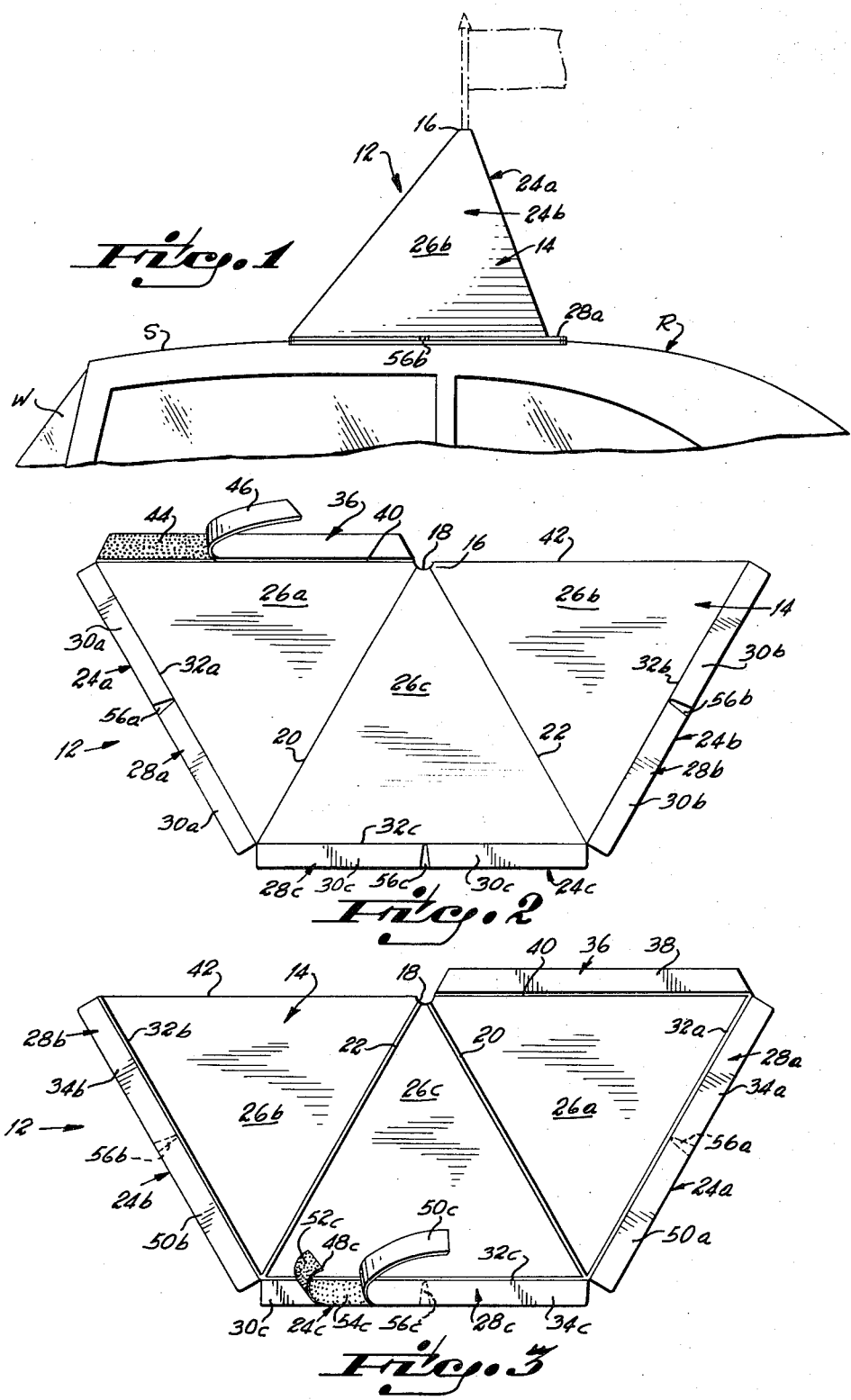

PATENTED AUG 13 1974 3,828,456
SHEET 2 OF 2
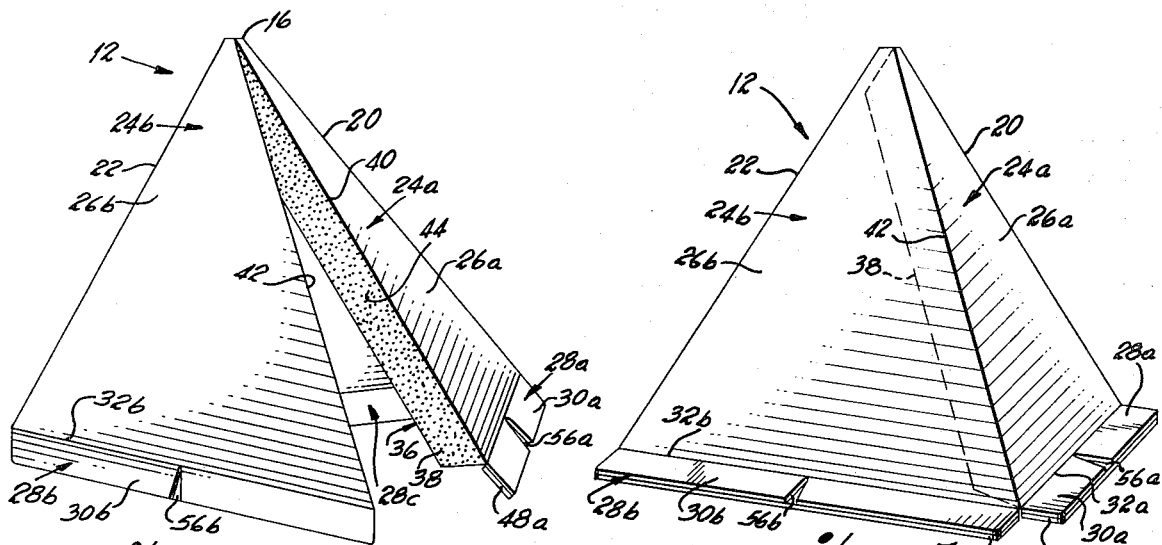
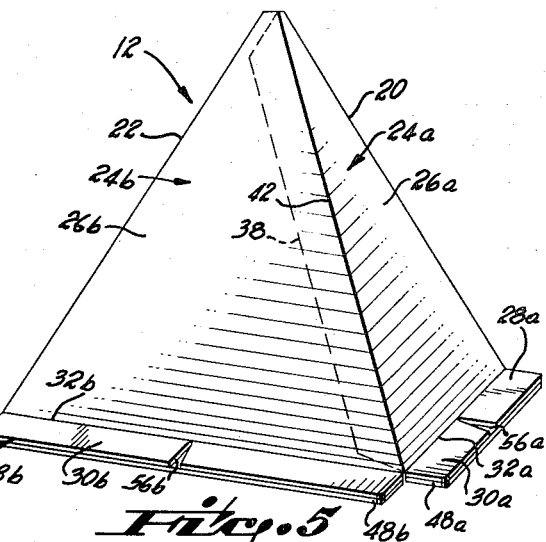
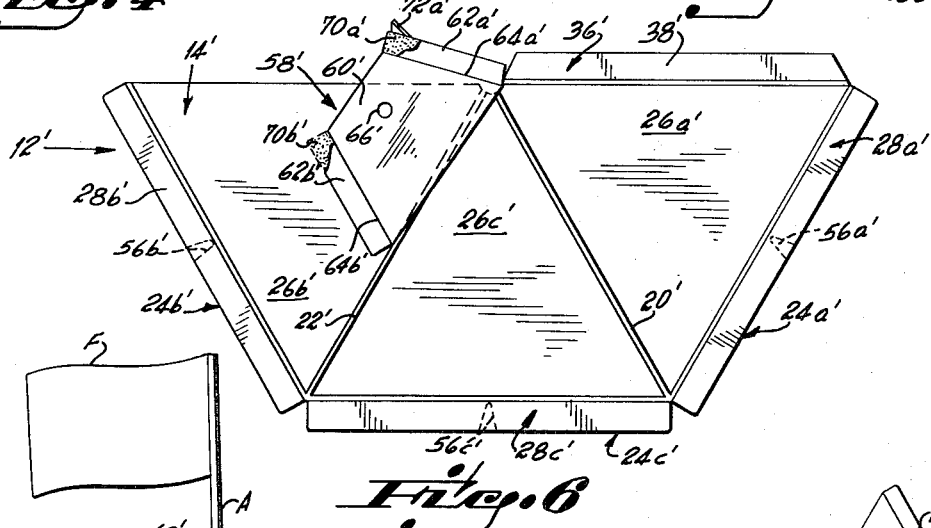
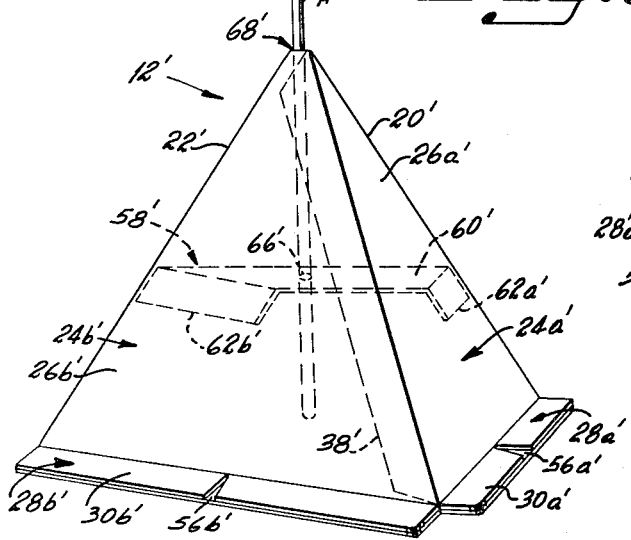
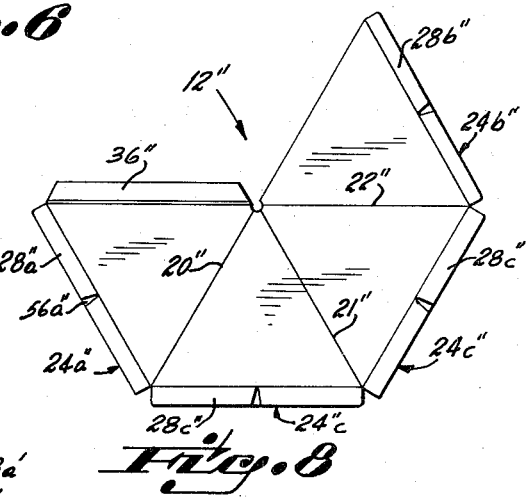

CAR TOP ADVERTISING STAND

BACKGROUND OF THE INVENTION

1. Field of the Invention

The invention relates to mobile advertising sign or display devices generally and particularly relates to erectable paperboard adversizing stand constructions adapted for mounting on a car top by contact or pressure sensitive adhesive.

2. Description of the Prior Art

A typical prior art advertising device is formed of paperboard material and adapted to be attached to a car top in an erected configuration. Generally, the prior art advertising device is of complicated design and is difficult to erect and install. Moreover, the advertising stand device may have sharp edges or rough surfaces which may damage the car top finish. The typical paperboard car top advertising device is of somewhat sleazy construction and when in erected configuration may present display areas of unsupported planar structure which are readily damaged by rain and wind, particularly when the advertising device is conveyed at high speed by an automobile. The typical modile advertising device is provided with sign surfaces facing leftward and rightward and generally perpendicular to the travel of the vehicle; such surfaces may not be effectively viewed from a direction forwardly or rearwardly of the vehicle.

SUMMARY OF THE INVENTION

The paperboard car top stand construction of the instant invention is of substantially simple design; it may be quickly and easily erected and secured to the top surface of an automobile by a person having negligible skill or practice. The advertising stand construction is of substantially durable design; it does not include broad flat unsupported sign panel areas subject to damage or disruption from adverse weather conditions and wind forces as the stand construction is conveyed at high speed. The pyramidal configuration of the advertising device also affords obliquely arranged advertising surfaces permitting a sign surface to be viewed more readily from a direction oblique to the travel direction of an automobile; the oblique sign surfaces of the instant invention may be readily viewed from a direction forwardly or rearwardly of a vehicle. The advertising stand device may also be utilized for supporting a flag staff or slender rod element; the device may be utilized for supporting a flag or banner bearing advertising indicia or an intelligible message. The advertising stand device is of substantially simple design and construction admitting of economical manufacture and marketing.

BRIEF DESCRIPTION OF THE DRAWINGS

FIG. 1 illustrates a preferred embodiment of the car top advertising stand means of the invention, shown in an erected form and attached to the roof structure of an automobile;

FIG. 2 is a plan view of the advertising stand device in an unfolded flattened configuration and as viewed from the obverse side thereof;

FIG. 3 is a plan view of the device, similar to FIG. 2, but viewed from the reverse side;

FIG. 4 is a perspective view of the device in a partially erected configuration;

FIG. 5 illustrates the device in fully erected pyramidal form;

FIG. 6 illustrates an embodiment of the invention adapted for vertically supporting a flag staff or the like illustrating the embodiment in an unfolded flattened configuration;

FIG. 7 illustrates the embodiment of FIG. 6 in a fully erected pyramidal form, in an in-use configuration supporting a flag; and FIG. 8 illustrates the advertising device of another embodiment of the invention.

DESCRIPTION OF THE PREFERRED EMBODIMENTS

A first embodiment of the invention (FIGS. 1–5) is indicated by numeral 12 and is shown and described in conjunction with an automobile (fragmentarily shown) having roof structure R and forwardly facing windshield structure W. The advertising stand device 12 basically includes a paperboard stand body 14 a trapezoidal configuration having a vertex area 16 defined in part by a curved edge recess 18; and, fold lines 20 and 22 demarcate the stand device into a leading section 24a, a trailing section 24b and an intermediate section 24c. The stand sections 24a, 24b, 24c include respectively stand body sections 26a, 26b, 26c and attaching tab means respectively 28a, 28b, 28c adapted for attaching the pyramidal stand body 14 to the top surface S of the automobile roof. The base tab means 28a, 28b, 28c include respectively paperboard tab portions 30a, 30b, 30c integrally connected along fold lines 32a, 32b, 32c to the triangular body sections 26a, 26b, 26c. Adhesive strip means 34a, 34b, 34c are supported respectively on the base tab portions 28a, 28b, 28c for securing the triangular stand construction on the automobile roof surface.

Connecting flap means 36 is provided for securing the outer edge portions respectively of the leading and trailing body sections 26a and 26b together, for maintaining the advertising stand device in pyramidal erected form. The connecting flap means 36 includes a paperboard flap portion 38 connected on a fold line 40 to the paperboard body 26a of the advertising stand leading section 24a. The flap portion 38 is adapted to be laminatingly secured to the edge portion 42 of the trailing section 24b in erecting the stand device; a coating 44 of contact adhesive is formed on the obverse side surface of the flap portion 38.

When the advertising stand device is being manipulated to an erected configuration, the adhesive coating 44 on the flap portion 38 is bonded to the reverse surface of the edge portion 42 of the triangular body section 26b. A cover strip 46 is laminatingly secured to the contact adhesive coating 44; in typical manner, the cover strip 46 is adapted to be stripped away from the contact adhesive 44, exposing the adhesive coating, preparatory to bonding the flap portion 38 of the leading section 24a to the edge portion 42 of the trailing section 24b.

In mounting the advertising stand device on the automobile roof surface, the tab portions 28a, 28b, 28c are turned outwardly respectively along fold lines 32a, 32b, 32c generally in coplanar relation; the triangular stand device 12 is adapted to be secured to the automobile roof surface by conjunctive action of the adhesive strip means 34a, 34b, 34c. The adhesive strip means are respectively of like design and action and the following description of adhesive strip means 34c will suffice also as description of strip means 34a and 34b:

The adhesive strip means 34c preferably includes a resilient strip element 48c formed of foam rubber material or the like and a cover strip 50c. The resilient strip element 48c is provided on opposite face surfaces respectively with coatings 52c and 54c of contact adhesive. The strip element 48c is provided on opposite face surfaces respectively with coatings 52c and 54c of contact adhesive. The strip element 48c preferably is permanently bonded to the tab portion 30c of the intermediate section 24c during manufacture of the stand device; the contact adhesive coating 52c laminatingly secures the resilient strip element 48c on the reverse side surface of the tab portion 30c. The strip 50c temporarily covers the contact adhesive coating 54c of the resilient strip element 48c; in typical manner, the cover strip 50c is peeled away from the contact adhesive 54c, exposing the contact adhesive for engagement with the automobile roof surface S. The cover strips 50a, 50b, 50c are stripped away from the resilient strip means 48a, 48b, 48c preparatory to mounting the stand device on the automobile roof.

The paperboard tab portions 30a, 30b, 30c preferably are provided respectively with tab slots 56a, 56b, 56c intersecting respectively the fold lines 32a, 32b, 32c of the leading, trailing and intermediate sections 24a, 24b, 24c of the advertising device. The tab slots 56a, 56b, 56c provide break means respectively in the tab portions 30a, 30b, 30c and in conjunction with the resilient strip elements 48a, 48b, 48c, provide means permitting the planar-arranged base tab portions of the pyramidal stand device to accommodate automobile roof surfaces of various convexity or contour.

FIGS. 6 and 7 illustrate an advertising stand device 12' of the second embodiment of the invention. The embodiment 12' is of design similar to the embodiment 12 (FIGS. 1–5) but additionally includes means for supporting a flag F or another display item. The advertising stand device 12' includes a stand body 14' provided with fold lines 20' and 22' demarcating the stand device into sections 24a', 24b', 24c' adapted to be supported in pyramidal configuration by connecting flap means 36'. Base tab means 28a', 28b', 28c' provide resilient adhesive means for securing the pyramidal stand construction on an automobile top surface. The tab base means 28a', 28b', 28c' also preferably is provided with tab slot structure 56a', 56b', 56c' for accommodating car top surfaces of different contour. The advertising stand device 12' includes brace structure 58' adapted for supporting the lower extension of the rod or staff A of the flag item. The brace means 58' preferably is of paperboard construction including a planar brace panel 60' and tab portions 62a', 62b' connected to the brace panel 60' respectively on fold lines 64a', 64b'.

When the advertising stand device is in erected configuration, the brace panel 60' is supported in a horizontal disposition by tab portions 62a', 62b' engaging respectively the triangular body sections 26a', 26b' of the advertising device. The brace panel 60' and corresponding tab portions 62a', 62b' are of trapezoidal configuration for correspondingly engaging respectively the diverging body sections 26a', 26b', of the erected device. A hole 66' is formed in the brace panel 60' for receiving the lower or butt portion of the flag staff. In using the advertising device 12' for supporting the flag F, the user has only to insert the butt portion of the staff A through the apex opening 68' of the stand device and through the hole 66' in the brace panel structure 60'.

The embodiment 12' preferably is manufactured and marketed in the configuration shown in FIG. 6, with the brace panel 60' being in a partially installed disposition. The brace means 58' preferably is adhesively supported on the paperboard body 14' of the unfolded stand device; the tab portion 62b' preferably is secured by adhesive 70b' to the reverse side surface of the triangular body section 26b' and in a disposition parallel with the base tab structure 28b'. A cover tape strip 72a' is superimposed over a contact adhesive surface 70a' during manufacture of the device. In positioning the brace panel 60' in the triangular hollow interior of the stand device 12', a user has only to peel off the cover strip 72a' from the tab portion 62a' and laminatingly secure the tab portion to the inside surface of the stand body section 26a'. The hole structure 66' of the brace panel and the vertex opening 68' are coaxial and in vertical alignment, affording means for supporting a flag staff A or other rod structure in a vertical position.

Although only a single stand device 12' is shown, and the device is described as supporting a flag F, it will be appreciated that in certain embodiments of the invention, a pair of stand devices 12' may be utilized for simultaneously supporting two rod or staff structures. Two stand devices 12', supported on a car top or the like, may be utilized for simultaneously supporting dual rod structure arranged respectively at opposite end portions of an advertising panel or banner and with the supporting rod structure being received respectively in the two stand devices.

FIG. 8 illustrates the advertising stand device 12'', similar to the device 12, but differing therefrom mainly in the pyramidal configuration respectively of the erected devices. The advertising device 12'' is of four-sided pyramidal form as compared with the three-sided pyramidal form of the device 12. The advertising device 12'' includes a leading section 24a'', a trailing section 24b'', and a pair of intermediate sections 24c'', 24c'' connected together respectively along fold lines 20'', 21'' and 22''. The device 12'' includes connecting flap means 36'' for securing the device in pyramidal erected form. Base tab means 28a'', 28b'', 28c'', 28c'', arranged in square configuration, secure the stand device to the automobile top surface. Tab slot structure, as represented by slot structure 56a'', is provided for facilitating flatwise engagement of the respective base tab portions to an automobile top surface and for accommodating automobile top surfaces of different configuration. Advertising indicia or the like may be formed on the planar obverse surfaces of each embodiment of the invention.

While the instant invention is shown and described in presently preferred embodiments, it will be appreciated that various changes and modifications may be made in the embodiments shown without departing from the spirit and scope of the invention.

I claim:

1. A car top sign adapted for attachment to the top surface of an automobile roof or the like including a generally elongate paperboard body of truncated triangular configuration having an obverse side and a reverse side and a vertex area disposed midway the base edge of said body, a series of fold lines formed in said body radiating from said vertex area, intersecting respectively the margin of said body and defining a plurality of generally triangular body sections including a leading section, a trailing section and an intermediate section, each section including diverging side portions and a base line portion in triangular arrangement, means adapted for connecting the leading and trailing sections together defining a hollow pyramidal stand construction and outturned means on each base line adapted for attaching said stand construction on the top surface of an automobile roof or the like; said means connecting the leading and trailing stand sections together includes a connecting flap portion, fold line means connecting said flap portion to a side portion of the leading section triangular body section, and adhesive means adapted for laminatingly securing said connecting flap portion to a side portion of said trailing section triangular body section; said outturned means for attaching the erected paperboard stand means on the top surface of an automobile roof includes a plurality of base tab portions, each portion connected to a base line portion of a respective triangular body section, and adhesive strip means adapted for flatwise securing each base tab portion to an automobile top surface; said strip means includes a coating of contact adhesive formed respectively on the obverse side of each base tab portion and adapted for contact engagement with an automobile roof top surface or the like, said car top sign being adapted to supportingly receive a slender flag staff or the like, wherein said vertex area defines a curved edge recess, and includes a brace element of paperboard form having a hole formed therein, and adhesive tab means adapted for attachment to the obverse side surfaces of respectively the paperboard stand body sections; the curved edge recess of said apex area and the hole structure of said brace element being adapted to coaxially receive a flag staff or the like.

* * * * *